United States Patent [19]

Osada et al.

[11] Patent Number: 4,984,881
[45] Date of Patent: Jan. 15, 1991

[54] ROTATION SUPPORTING DEVICE OF A POLYGON MIRROR

[75] Inventors: Noriyuki Osada, Tokyo; Yasushi Hisabe, Kanagawa; Toshihiro Ohtani, Kanagawa; Toshiya Kanamori, Kanagawa, all of Japan

[73] Assignee: Ebara Corporation, Tokyo, Japan

[21] Appl. No.: 452,935

[22] Filed: Dec. 19, 1989

[51] Int. Cl.$^5$ .......................... G02B 7/18; G02B 26/10
[52] U.S. Cl. ........................................ 350/616; 350/6.8
[58] Field of Search .................. 350/616, 6.8, 6.7, 6.5; 310/46

[56] References Cited

U.S. PATENT DOCUMENTS

| | | | |
|---|---|---|---|
| 4,609,251 | 9/1986 | Nakaoka et al. | 350/6.8 |
| 4,717,223 | 1/1988 | Ishida et al. | 350/6.8 |
| 4,726,640 | 2/1988 | Iwama et al. | 350/6.8 |
| 4,805,972 | 2/1989 | Tanaka et al. | 350/6.7 |
| 4,836,631 | 6/1989 | Shimazu et al. | 350/6.8 |

FOREIGN PATENT DOCUMENTS

| | | | |
|---|---|---|---|
| 59-28757 | 2/1984 | Japan . | |
| 138916 | 6/1986 | Japan | 350/6.8 |
| 85216 | 4/1987 | Japan | 350/6.8 |
| 63-241515 | 2/1988 | Japan . | |
| 63-87162 | 4/1988 | Japan . | |
| 63-100416 | 5/1988 | Japan . | |
| 63-241516 | 10/1988 | Japan . | |
| 63-241517 | 10/1988 | Japan . | |

OTHER PUBLICATIONS

Design of Gas Bearings, D. F. Wilcock, J. E. Carbino, Jr. 1972; vol. 1, pp. 6.1.21-42.
Design of Gas Bearings, D. F., Wilcock, J. E. Carbino, Jr., 1972; vol. 2, pp. 6.3.1-24.

Primary Examiner—Jon W. Henry
Attorney, Agent, or Firm—Wenderoth, Lind & Ponack

[57] ABSTRACT

A rotation supporting device of a polygon mirror comprising a stationary shaft provided with a shaft sleeve around its circumference, a rotary assembly rotatably mounted around the circumference of the shaft sleeve and having a radial circumferential surface of a polygon made to serve as mirror surfaces and having a magnet member, thrust plates for suppressing the motion of a rotary assembly in the axial direction. The rotary assembly comprises a first rotor rotatably mounted at the outer circumference of the shaft sleeve, a second rotor having a circumferential surface of a polygon made to serve as mirror surfaces and being disposed at the outer circumference of the first rotor, and a yoke secured on the outer circumference of the first rotor. The first rotor is made of a ceramic material, the second rotor is made of aluminum and the yoke is made of steel. Radial dynamic pressure bearing is included between the outer circumference of the shaft sleeve and the rotary assembly. Dynamic thrust pressure bearings are included between the end surfaces of a rotary assembly and the thrust plates.

12 Claims, 8 Drawing Sheets

ROTATION SUPPORTING DEVICE OF A POLYGON MIRROR

TECHNICAL FIELD

The present invention relates to a rotation supporting device of a polygon mirror used for laser printers, bar code readers, laser copiers and the like.

BACKGROUND OF THE INVENTION

There are a number of known techniques for constructing polygon mirrors in the prior arts. Generally, the larger the number of rotations, the more capable the polygon mirror, so it is driven to rotate at a high speed of, for example, 30,000 rpm. However, when a polygon mirror, i.e., a polygon rotation body having mirror surfaces rotates as such a high speed, it is deformed by centrifugal force. If such deformation is not uniform, irregularities occur in mirror surfaces, resulting in a disturbance of images. Also when rotating at high speed, a so-called precession motion and deflections are also liable to occur. When a polygon mirror moves in the form of the precession motion, naturally the image is disturbed. For this reason, various kinds of supporting devices for polygon mirrors have been proposed.

For example, in the art disclosed in Japanese Patent Public Disclosure No. 59-28757, a metal is used in sliding surfaces of a rotor, and the rotor is structured to receive a radial load by a dynamic pressure generated by grooves which is arranged in a herringbone configuration. However, when a radial load is increased at the time of high-speed rotation, the ordinary task of supporting the polygon mirror using an air film made by dynamic pressure generation grooves of a herringbone configuration becomes difficult. Balancing adjustments are also troublesome and neither can precession motion be prevented.

The present applicant proposes a polygon mirror capable of rotating stably at high speed and reflecting laser beams with a high degree of precision and which was disclosed in Japanese Patent Public Disclosure No. 63-241515.

For further understanding of the present invention, the prior art in the above-mentioned Japanese Patent Public Disclosure No. 63-241515 will now be explained with reference to FIG. 10.

In a laser printer, for example, laser beams from a laser unit comprising a semiconductor laser or gas laser pass through a window 13 and are reflected by mirrors 2 formed on the circumferential surfce of a rotor 3, and then directed to the surface of a sensitizing body. A magnet member 7 is integrally mounted in the rotor 3 with a backup ring 9. The radial load of rotor 3 is born by a stationary shaft 5 provided at its center and its own-weight is received by a thrust plate 10. Though not shown, a prior art in which a thrust plate is provided on the upper part of the rotor 3 is known, too. Grooves 11 of a herringbone configuration and a spiral configuration are formed on the sliding surface of the stationary shaft 5 and the thrust plate 10. Dynamic pressure is generated by an air film and the radial load and the thrust load are thereby sustained.

The stationary shaft 5 is fixedly mounted on a casing 4 and on this casing are provided stator coils 6 facing opposite to the magnet member 7.

In such a prior art, the mirrors 2 are convered with evaporation of aluminum or the like, so it is difficult to achieve a high degree of accuracy (ca. several microns). Since the magnet member 7 is buried discontinuously in a rotor, ununiform deformation is apt to be caused in such a rotor, particularly when rotated at high-speed. The mirror surfaces of a rotor are therefore deformed, resulting in a disturbance of the motion of reflected light.

There is a known method in which a polygon rotor is made by employing an aluminum alloy as mirror surfaces. In this case, however, the rotor is fragile and liable to be deformed.

As a result of various studies, the present inventors found that though ununiform deformations of a rotor are undesirable, no problems arise when a rotor is uniformly deformed by a centrifugal force, and that by improving construction of transmission path for rotational torque given to a magnet member, ununiform deformations can be prevented.

Therefore, an object of the present invention is to provide a rotation supporting device of a polygon mirror whereby ununiform deformations in a rotor are prevented.

SUMMARY OF THE INVENTION

A rotation supporting device of a polygon mirror of the present invention comprises a stationary shaft provided with a shaft sleeve around its circumference, a rotary assembly rototably mounted on the circumference of the shaft sleeve and having a radial circumferential surface of a polygon made to serve as mirror surfaces and having a magnet or iron core (hereinafter referred to as a "magnet member"), an electromagnetic coil assembly disposed on a stationary section facing opposite to the magnet member, at least one thrust plate for suppressing the motion of a rotary assembly in the axial direction, the rotary assembly having a first rotor rotatably mounted around the outer circumference of the shaft sleeve, a second rotor having a radial circumferential surface of a polygon made to serve as a mirror surface and being secured on the outer circumference of the first rotor, and an annular yoke disposed on one of the ends of the second rotor and secured on the outer circumference of the first rotor, the magnet member being adhered on the yoke.

It may be arranged in such a manner that a balancing ring is disposed adjacent to the other end of the second rotor on the opposite side of the yoke and the balancing ring is shrink-fitted onto the first rotor.

The first rotor is made of a ceramic material and the second rotor is made of aluminum or an aluminum alloy (hereinafter called merely as "aluminum-type"). It may be arranged in such a way that the second rotor is shrink-fitted onto or secured to the outer circumference of the first rotor, and the yoke made of steel is shrink-fitted onto or secured to the outer circumference of the first rotor.

The yoke should preferably be formed of a material which ensures that deformations of the yoke due to centrifugal force are not so different from deformations of the first rotor.

Radial dynamic pressure bearing is formed between the outer circumference of the shaft sleeve and the rotary assembly. A thrust plate is provided facing each end of the rotary assembly. A thrust dynamic thrust pressure bearing is formed between each end surface of the rotary assembly and each end surface of the thrust plate. A force in a direction reverse to dynamic thrust pressure in one thrust plate is preloaded by a magnetic force.

A thrust plate is provided facing opposite to either an upper or lower end surface of the rotary assembly, in addition to dynamic thrust pressure bearings being formed between one of the end surfaces of the rotary assembly and the thrust plate, and a force in a direction reverse to the dynamic thrust pressure can thereby act between them. A force in a direction reverse to the dynamic thrust pressure can be converted to a force in the direction of a thrust in a magnetic force acting between the magnetic member included in the rotary assembly and an electromagnetic coil assembly provided on a stationary section.

The electromagnetic coil assembly comprises electromagnetic coils, or electromagnetic coils and iron cores, or those added to an electromagnetic coil yoke for shortening magnetic force lines.

The rotary assembly can be made to include a first rotor rotatably mounted on the outer circumference of a shaft sleeve, an intermediate ring which is shrink-fitted onto the outer circumference of the first rotor, a second rotor having radial outer circumference surfaces of a polygon made to serve as mirror surfaces and being secured on the outer circumference of the intermediate ring, and a yoke disposed adjacent to one of the ends of the second rotor and secured to the outer circumference of the first rotor or the above-mentioned intermediate ring. In this case, the amount of elastic deformation of the intermediate ring is made larger than that of the first rotor and smaller than that of the second rotor. In this rotary assembly, the first rotor is made of a ceramic material; the intermediate ring, a stainless-steel material; and the second rotor, aluminum type. The second rotor is shrink-fitted or adhered onto the outer circumference of the intermediate ring. The yoke is made of steel and is shrink-fitted or adhered onto the outer circumference of the first rotor or the intermediate ring.

The rotary assembly can be arranged in such a manner as to include a first rotor rotatably mounted on the outer circumference of a shaft sleeve, a second rotor having radial outer circumferential surfaces of a polygon made to serve as mirror surfaces and being disposed on the outer circumference of the first rotor, and yoke being adjacent to one of the ends of the second rotor and secured to the outer circumference of the first rotor, a magnetic member being adhered onto the yoke and the second rotor and the yoke being integrally secured together.

In this rotary assembly, the first rotor is made of a ceramic material; the second rotor is aluminum-type; and the yoke is made of steel. The yoke is shrink-fitted or adhered onto the outer circumference of the first rotor and a means for securing the second rotor and the yoke can include at least set bolts, or both or either of ferrules or elastic plate bodies in addition to set bolts.

The rotary assembly can be arranged in such a manner as to include a first rotor rotatably mounted on the outer circumference of a shaft sleeve, a cylindrical yoke having a flange and being secured to the outer cirumference of the first rotor and a second rotor having a radial outer circumferential surface of a polygon made to serve as a mirror surface and being disposed on the outer circumference of the cylindrical portion of the yoke, and the yoke and the second rotor being integrally secured. In this case, the first rotor is made of a ceramic material; the second rotor is aluminum-type; and the yoke is made of steel. The yoke is shrink-fitted or adhere onto the outer circumference of the first rotor and the securing means for the second rotor and the yoke can include at least set bolts, or both or either of ferrules or elastic plate bodies in addition to set bolts.

In the present invention, as for the shaft sleeve and the first rotor and the thrust plate which are sliding members, at least either of the mating sliding members should preferably be made of an inorganic material, namely, a ceramic material, preferably silicon carbite, silicon nitride or alumina materials.

Materials having a high specific strength (tensile strength per unit weight) such as aluminum, titanium, plastics, etc. should preferably be employed for the second rotor. In a case where aluminum is used, a mirror surface can be machined directly on the outer circumferential surface of the second rotor without performing aluminum deposition.

In the present invention, a rotational torque given to a magnetic member formed in an annular configuration is transmitted to the annular yoke. Since the yoke is secured to the first rotor, the torque transmitted to the yoke is transmitted to the first rotor. The load in the radial direction of a rotary assembly rotating at high speed is sustained by the shaft sleeve. The load in the axial direction of the rotary assembly, that is, the thrust load is sustained by at least one of the upper and lower thrust plates.

In one rotary assembly of the present invention, the rotational torque of the first rotor is directly transmitted to the second rotor which is shrink-fitted onto the outer circumference of the first rotor. The second rotor, on the outer circumference of which mirror surfaces are formed, has no unbalance elements. If the second rotor itself is machined properly, no ununiform deformations caused by its rotation will occur.

The second rotor, made of aluminum, is liable to be deforming owing to the physical properties of the material in addition to the fact that it is more situated on the outer circumference than the ceramic-type first rotor. However, the second rotor can sufficiently transmit the rotational force by an allowance made during shrink-fitting. This situation also applies to a steel-type yoke.

As a result, a rotation supporting device of a polygon mirror suitable for high-speed rotation can be obtained.

For use at a relatively low rotational speed, the second rotor may simply be adhered rather than being shrink-fitted. This would also apply to the yoke.

In the present invention, right angle configuration between the thrust plate and the shaft sleeve can be easily achieved by pressing down them with, for example, mounting nuts, only provided that the degree of flatness of the thrust plate and the right angle configuration between the end surface of the shaft sleeve and its outer circumferential surface are correctly formed.

Since the distance between the thrust plates when two thrust plates are used in equal to the height of the shaft sleeve, a correct height of the shaft sleeve enables the distance to be correctly and easily spaced. The distance of the section between the upper and lower thrust plates can be adjusted very easily by changing the length of the shaft sleeve. Since the shaft sleeve is thick and cylindrical in shape, it is easy to accurately form the distance between them on the basis of the finished dimensions of the first rotor.

The first rotor includes both radial and thrust bearings, so the bearing construction is simple and the number of parts required is small.

By preloading to a thrust plate by means of a magnetic force in a reverse direction to the thrust dynamic pressure, an inclination of an axis line to the radial bearing can be corrected. Localized contact can be removed and a starting torque can be decreased. The rotary assembly is prevented from being sprung out by the thrust dynamic pressure and a stable rotation can be obtained even when used in a horizontal position.

When the rotary assembly has a first rotor rotatably mounted on the outer circumference of the shaft sleeve, an intermediate ring which is shrink-fitted onto the outer circumference of the first rotor, a second rotor having a radial outer circumferential surface of a polygon made to serve as a mirror surface, and a yoke disposed adjacent to one of the ends of the second rotor and secured to the outer circumference of the first rotor or an intermediate ring, the rotational torque of the first rotor is transmitted to the second rotor via the intermediate ring. Owing to the fact that the second rotor is mounted at more outer periphery than the first rotor and materials such as aluminum are used, there exists a problem in that the amount of elastic deformation of the second rotor is larger than that of the first rotor and the second rotor is liable to be unacceptably deformed. However, since an intermediate ring whose amount of elastic deformation is larger than that of the first rotor and smaller than that of the second rotor is included between the two rotors, even when the shrink-fitting force of the second rotor is small, the intermediate ring alleviates the difference in the amount of deformation between the second and first rotors. For this reason, a predetermined fastening force is maintained even at the time of high-speed rotation. The amount of ununiform deformation of the second rotor is small, thus the accuracy of the polygon mirror is maintained.

When the rotary assembly has a first rotor rotatably mounted on the outer circumference of the shaft sleeve, a second rotor having a radial outer circumferential surface of a polygon made to serve as mirror surfaces disposed on the outer circumference of the first rotor, a yoke adjacent to one of the ends of the second rotor and secured on the outer circumference of the first rotor, and is constructed in such a way that the second rotor and the yoke are integrally secured by the inclusion of, for example, at least set bolts, or both or either of the ferrules or elastic plate bodies in addition to the set bolts, a rotational torque given to the annular magnet member is transmitted to the second rotor via the yoke and the securing means, causing the second and first rotor to rotate, since the yoke is shrink-fitted onto the first rotor. Since the load in the radial direction of the first rotor is sustained by the shaft sleeve and the thrust load is sustained by at least one or both of the upper and lower thrust plates, neither the first nor second rotor is deflected in the axial direction. The second rotor has no unbalanced elements, so if the second rotor itself is accurately machined, ununiform deformations during rotation do not occur. Since the second rotor is not shrink-fitted onto the first rotor, the difference between the amounts of deformation due to the centrifugal force of the two rotors is alleviated in the boundary surface of the two rotors. Therefore, deformations of the second rotor do not become ununiform due to differences between the amounts of the deformations. Since a uniform elastic fastening force is applied over the entire circumference of the second rotor by set bolts, ferrules and elastic plate bodies, the second rotor is prevented from being deformed ununiformly. Even when no elastic plate bodies exists, since deflections in the radial direction of the second rotor will not be restricted because of local elastic deformations in the shoulder of the set bolts, ununiform deformations of the second rotor can be prevented. The second rotor may be either slightly shrink-fitted or clearance fitted onto the first rotor.

When the rotary assembly has a first rotor rotatably mounted on the outer circumference of the shaft sleeve, a second rotor having a radial outer circumferential surface of a polygon made to serve as mirror surfaces disposed on the outer circumference of the cylindrical portion of the yoke, is constructed in such a way that the yoke and the second rotor are integrally secured by securing means, e.g., set bolts, ferrules or elastic plate bodies such as rubber, in the same manner as in the above, a rotational torque provided to the annular magnet member is transmitted to the second rotor via the yoke and the securing means, causing the second as well as the first rotor to rotate, since the yoke is shrink-fitted onto the first rotor. Since the radial load of the first rotor is sustained by the shaft sleeve and the thrust load is sustained by at least one or both of the upper and lower thrust plates, neither the first nor second rotor is deflected in the axial direction at high speed. The second rotor has no unbalanced elements, so if the second rotor itself is accurately machined, uniform deflections during rotation do not occur. There arises no problem if the second rotor is not shrink-fitted onto the first rotor and there is a clearance of 20 $\mu$m or thereabouts. Therefore, deformations of the second rotor do not become ununiform due to differences between the amounts of the deformations. Since a uniform elastic fastening force is applied over the entire circumference of the second rotor by set bolts, ferrules and elastic plate bodies, the second rotor is prevented from being deformed ununiformly. Even when no plastic plate bodies exist, since the second rotor can be made to slide by means of local elastic deformations in the shoulder of the set bolts, ununiform deformations of the second rotor can be prevented. As a result, a polygon mirror which is suitable for high-speed rotation can be obtained.

DETAILED DESCRIPTION OF THE PREFERRED EMBODIMENT

Figure 1:
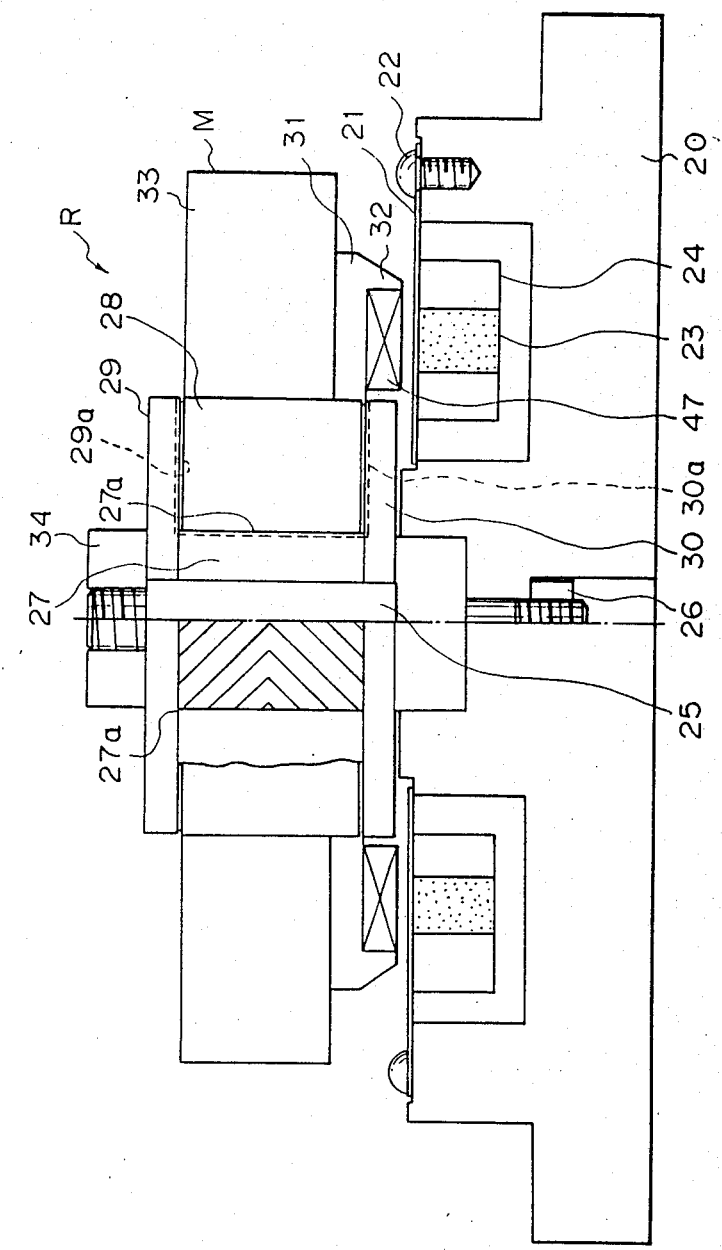
FIG. 1 is a side view illustrating a partial cross section of the first embodiment of the present invention.
Figure 8:
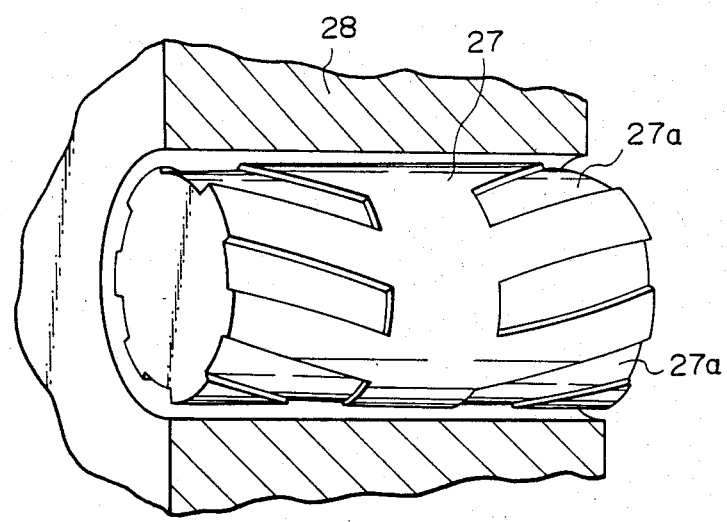
FIG. 8 is a perspective view schematically illustrating a radial dynamic pressure bearing.

FIG. 1 shows the first embodiment of the present invention. In the figure, a rotational supporting device of a polygon mirror has a casing 20, on the top surface of which is mounted a coil board 21 by a set bolt 22 and inside of which are disposed iron cores 23 and electromagnetic coils 24 constituting a motor. A stationary shaft 25 is fixed to the center of the casing 20 by means of a lower set bolt, and on the outer circumference of the stationary shaft 25 is provided a shaft sleeve 27 which has a dynamic pressure generation grooves 27a in the form of a herringbone as shown in FIG. 8, on the outer circumference.

Figure 9:
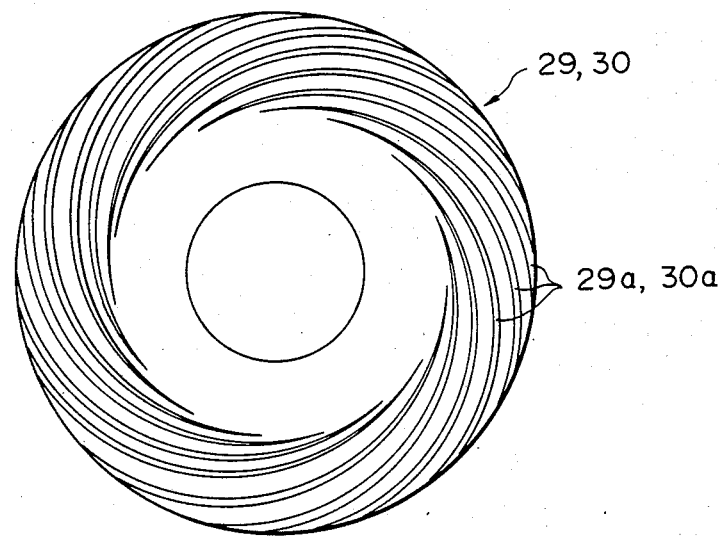
FIG. 9 is a plan view schematically illustrating grooves in the form of a spiral configuration provided on the thrust bearing.
Figure 10:
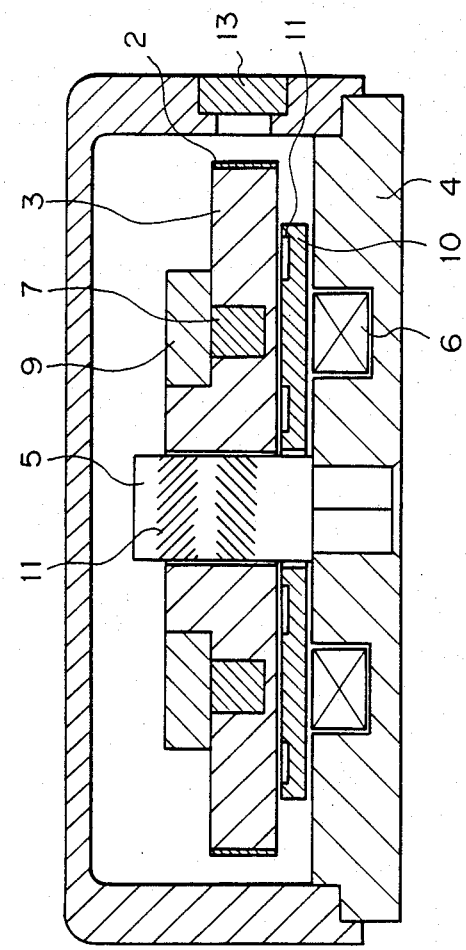
FIG. 10 is a sectional front view illustrating the prior art.

The rotary assembly R, including an annular ceramic-type rotor 28, is provided on the outer circumference of the shaft sleeve 27. An upper thrust plate 29 and a lower thrust plate 30, made of a ceramic material, are provided with a ceramic-type rotor 28 therebetween, and receive a thrust load in the axial direction of the rotary assembly R. A set nut 34 presses the upper thrust plate 29 and the shaft sleeve 27 and the ceramic-type rotor 28 are supported between the upper and lower thrust plates. Spiral dynamic pressure generation grooves 29a, 30a, as shown in FIG. 9, are formed on the side of the ceramic-type rotor 28 of the upper and lower thrust plates 29, 30, respectively.

An annular yoke 31 is shrink-fitted onto the outer circumference of the lower part of the ceramic-type rotor 28. The yoke is made, for example, of steel such as stainless steel and is mounted by means of an annular magnetic member 47 made of magnets or iron cores being adhered onto a flange 32 extending downward to the yoke. On the upper side of the yoke 31, an aluminum-type rotor 33, which is polygonal in the plan view, and on the outer circumference of which the Mirrors M are formed, is fixed on the outer circumference of the ceramic-type rotor 28 by shrink-fitting.

By controlling the current flowing through the coil 24 of the motor, a rotational torque is applied to the magnetic member 47 by a known mode. This rotational torque is transmitted to the yoke 31, and the rotational torque of the yoke 31 is transmitted to the ceramic-type rotor 28 onto which the yoke is shrink-fitted. The ceramic-type rotor 28 is sustained by the shaft sleeve 27 via an air film in the inside of the radial direction and is sustained by the upper and lower thrust plates 29, 30 via an air film in the upward, downward, that is, axial directions, so virtually no deflections occur. The rotational force of the ceramic-type rotor 28 is transmitted to the aluminum-type rotor 33 which is shrink-fitted onto the outer circumference of the ceramic-type rotor 28. Therefore, the vibrations of the aluminum-type rotor 33 can be kept to a minimum and the reflection accuracy by the mirrors on the aluminum-type rotor 33 is thereby improved.

The aluminum-type rotor 33 and yoke 31 act to separate from the ceramic-type rotor 28 in the radial direction by a centrifugal force, but the rotational force is sufficiently transmitted by shrink-fitting. Although the amounts of deformations of the yoke 31 and the aluminum-type rotor 33 differ, no interference due to the difference between the different amounts of deformations occurs since the yoke 31 and rotor 33 are separately shrink-fitted onto the ceramic-type rotor 28. Therefore, the aluminum-type rotor 33 deforms uniformly and an accurate image free from distortions can be obtained.

In constructing the rotary assembly according to the present invention, individual parts of the rotary assembly R are balanced. When the parts are assembled as a whole, in a case where balancing adjustments are made, a weight may be added to or subtracted, for example, from the yoke.

Figure 2:
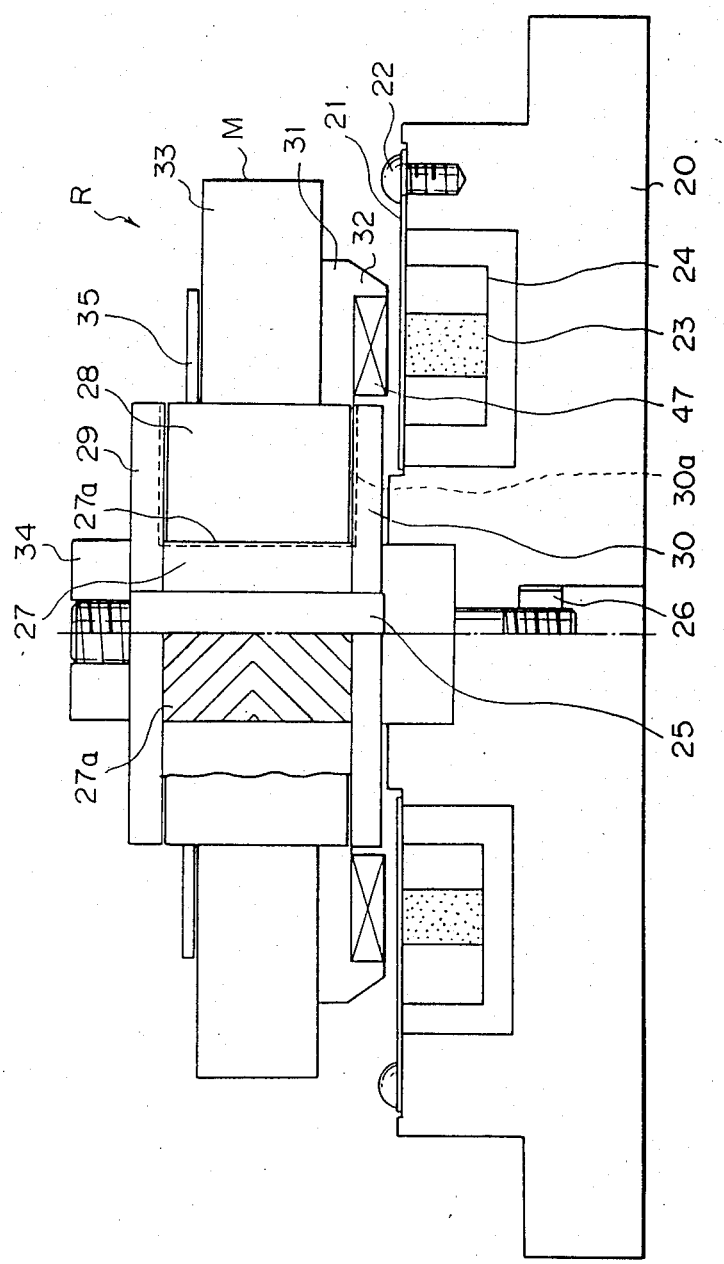
FIGS. 2 to 5 are views similar to FIG. 1 illustrating the second to fifth embodiment of the present invention.

FIG. 2 shows the second embodiment of the present invention, in which a balance ring 35 is shrink-fitted onto the ceramic-type rotor 28 adjacent to the upper end of the aluminum-type rotor 33 in order for the mirror surfaces of the aluminum-type rotor 33 not to be deformed when a rotary assembly is balance adjusted. In this case, balance adjustments should be made on the yoke 31 and the balance ring 35. The other portions are virtually the same as for those of an example in FIG. 1, so the explanation is omitted.

Figure 3:
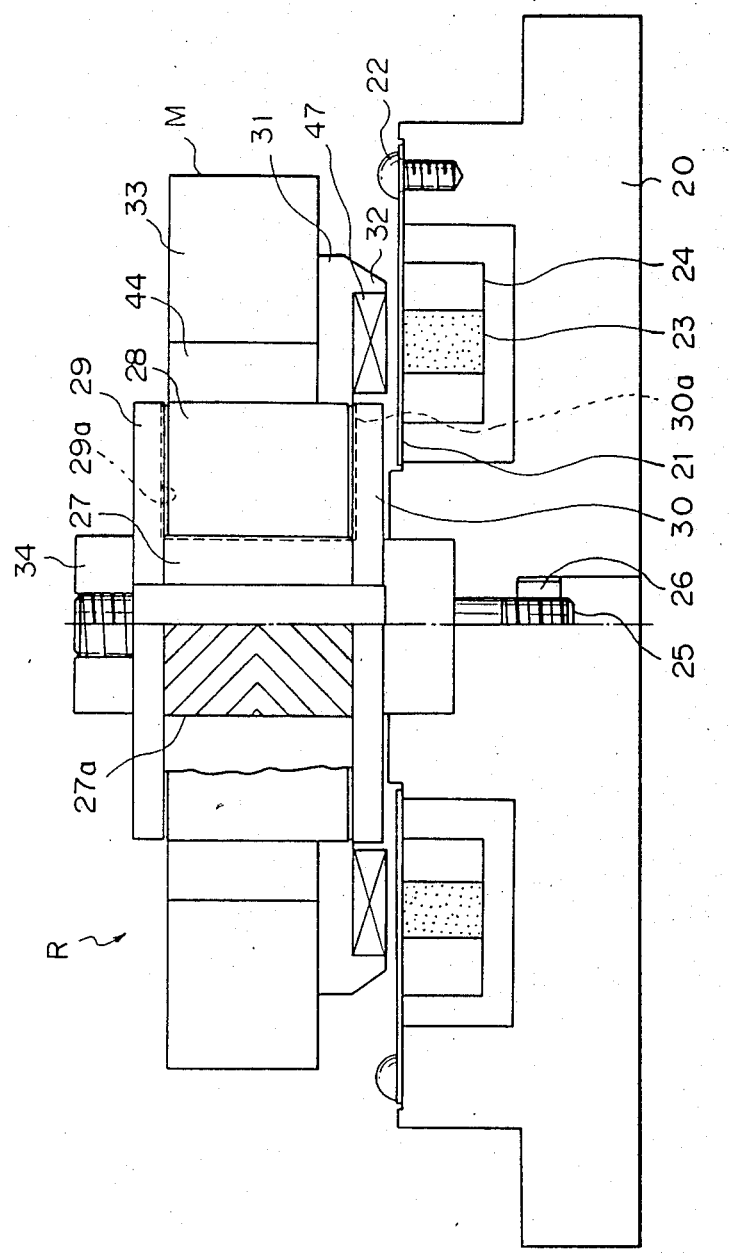

FIG. 3 shows the third embodiment of the present invention. The basic configuration of the rotation supporting device, including the casing 20, the stationary shaft 25, the shaft sleeve 27 having the dynamic pressure generation groove 27a around its circumference, the ceramic-type rotor 28, the ceramic-type upper thrust plate 29 and the lower thrust plate 30 and the yoke 31 is the same as the embodiment of FIG. 1.

In the rotary assembly R of FIG. 3, an intermediate ring 44 is disposed between the ceramic-type rotor 28 and the aluminum-type rotor 33. The intermediate ring 44 is fixed around the outer circumference of the ceramic-type rotor 28 and the aluminum-type rotor 33 is fixed around the outer circumference of the intermediate ring 44 by shrink-fitting. The intermediate ring 44 is formed of a material capable of a greater degree of elastic deformations than that of a ceramic material and a smaller degree than that of an aluminum alloy, for example, stainless steel.

In FIG. 3 is shown a set nut 34 for fixing the shaft sleeve 27 and the upper and lower thrust plates 29, 30.

In the same manner as in the first embodiment, by controlling the current flowing through the coils 24 of a motor, a rotational torque is provided to the magnetic member 47 in a known mode. The rotational torque applied to the magnetic member 47 is transmitted to the aluminum-type rotor 33 via the yoke 31, the ceramic-type rotor 28 and the intermediate ring 44, and therefore the mirror surfaces are caused to rotate at high speed.

When the rotary assembly R rotates at high speed, the ceramic-type rotor 28 and the aluminum-type rotor 33 differ in the amount of elastic deformations caused by the centrifugal force of its rotation. However, the difference between the amounts of deformations are alleviated by the presence of the stainless-steel-type intermediate ring.

The ceramic-type rotor 28 is held by the shaft sleeve 27, the upper and lower thrust plate 29, 30 in three directions, therefore, the rotary assembly R will neither deflect in the upward, downward nor radial direction. Here, the yoke may be shrink-fitted to the intermediate ring 44 in place of the first rotor 28.

Figure 4:
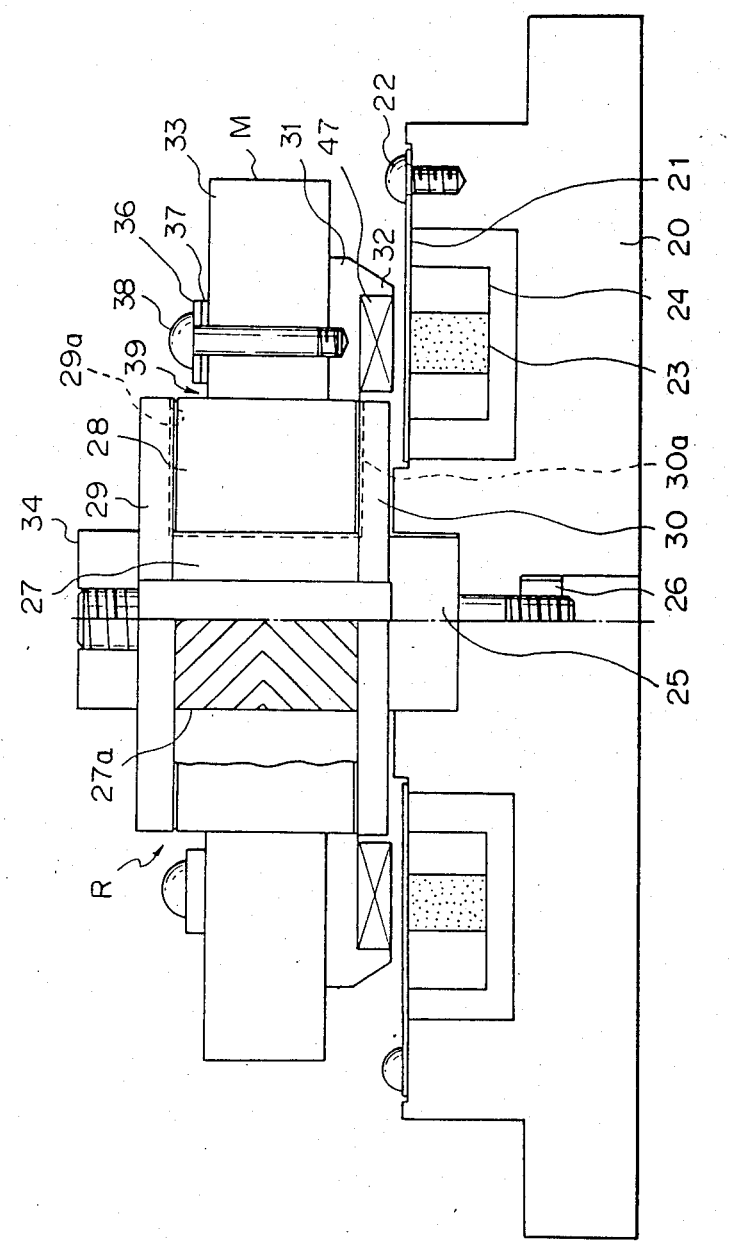

FIG. 4 shows the fourth embodiment of the present invention. The basic configuration of the rotation supporting device, including the casing 20, the stationary shaft 25, the shaft sleeve 27 having the dynamic pressure generation groove 27a around its circumference, the ceramic-type rotor 28, the ceramic-type upper thrust plate 29 and the lower thrust plate 30 and the yoke 31 is the same as the embodiment of FIG. 1.

In the embodiment of FIG. 4, the yoke 31 is shrink-fitted onto the outer circumference of the ceramic-type rotor 28. The ceramic-type rotor 28 and the aluminum-type rotor 33 are not shrink-fitted and separated in their boundary 39. The yoke 31 and the aluminum-type rotor 33 are integrally fixed by set bolts 38, ferrules 36 and elastic plate bodies 37 made of, for example, rubber.

In the same way as the first embodiment, by controlling the current flowing through the coil 24 of the motor, a rotational torque is provided to the magnet member 47 in a known mode. The rotational torque applied to the magnet member 47 is transmitted to the yoke 31 and the ceramic-type rotor 28, as well as to the aluminum-type rotor 33 from the yoke 31 via the set bolts 38, and thus the mirror surfaces M of the aluminum-type rotor 33 are rotated at high speed.

The amounts of deformations generated by the centrifugal force at high-speed rotation are larger for the aluminum-type rotor 33 than for the ceramic-type rotor 28, but the difference is alleviated in the boundary 39. Therefore, the difference between the amounts of deformations does not cause deformation of the aluminum-type rotor 33 to become ununiform.

Since the aluminum-type rotor 33 is added with a uniform fastening force over the entire circumference thereof by the set bolts 38, the ferrules 36 and the elastic plate bodies 37 and is fixed integrally to the yoke 31, a local stress due to localization of the fastening force does not exist in the aluminum-type rotor 33 and it is relatively uniformly deformed by the centrifugal force.

Further, since the steel-type yoke 31 is shrink-fitted onto the ceramic-type rotor 38 and the differences between the amounts of deformations of them are relatively small, the force caused by the shrink-fitting is not so much decreased even at the time of high-speed rotation.

Figure 5:
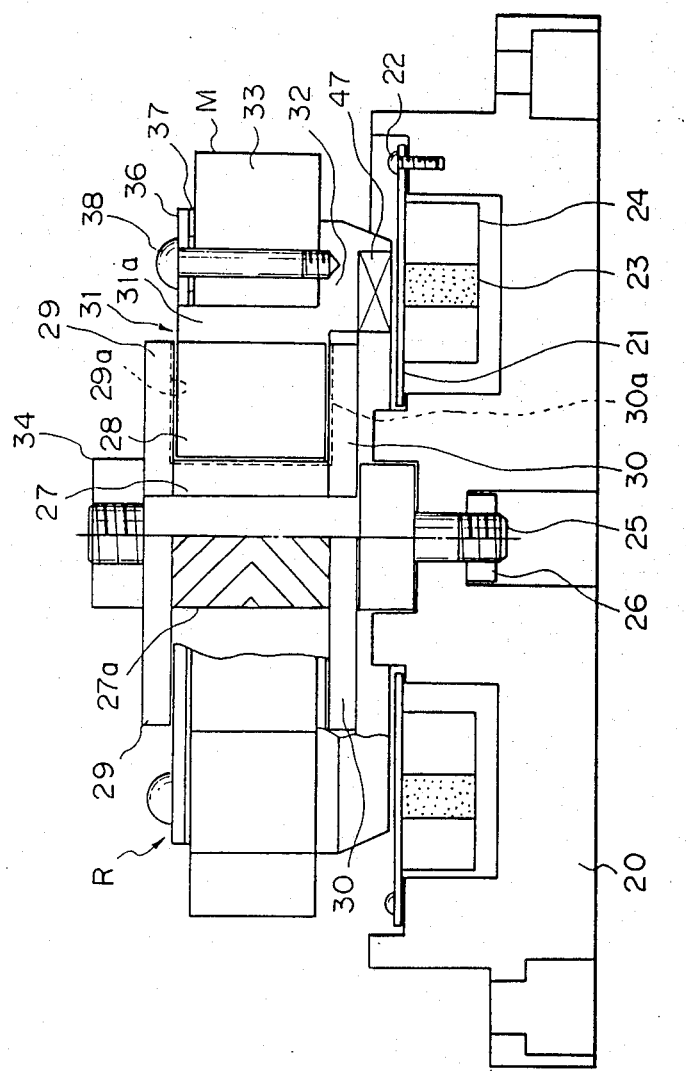

FIG. 5 shows the fifth embodiment of the present invention. The basic configuration of the rotation supporting device including the casing 20, the stationary shaft 25, the shaft sleeve 27 having the dynamic pressure generation groove 27a around its circumference, the ceramic-type rotor 28, the ceramic-type upper thrust plate 29 and the lower thrust plate 30 and the yoke 31 is the same as the embodiment of FIG. 1.

In this embodiment, the yoke is shrink-fitted around the outer circumference of the ceramic-type rotor 28. The yoke includes a cylindrical portion 31a and a flange section 32. The aluminum-type rotor 33 is disposed around the outer circumference of the cylindrical portion 31a of the yoke. The top plan shape of the aluminum-type rotor 33 is polygonnal and around its outer circumferential surface is formed into mirror surfaces. The aluminum-type rotor 33 is fixed to the flange 32 of the yoke 31 by the set bolts 38, the elastic plate bodies 37 (e.g., rubber plates) and the ferrules 36. Shown in FIG. 5 is a set nut 34 for fixing the thrust plate 29 to the shaft sleeve 27 and the ceramic-type rotor 28.

In the embodiment of FIG. 5, by controlling the current flowing through the coil 24 of the motor, a rotational torque is applied to the magnet member 47. This rotational torque is transmitted to the yoke 31, and to the ceramic-type rotor 28 via the cylindrical portion 31a of the yoke, as well as to the aluminum-type rotor 33 from the flange 32 of the yoke via the set bolts 38.

At the time of rotation, the amount of deformation due to the centrifugal force of the aluminum-type rotor 33 is larger than that due to the centrifugal force of the ceramic-type rotor 28. However, since the outer circumferential surface of the cylindrical portion 31a of the yoke and the inner circumferential surface of the aluminum-type rotor 33 are not shrink-fitted, the differences between the amounts of deformations of them are alleviated. For this reason, even when the centrifugal force becomes larger, the aluminum-type rotor 33 is deformed uniformly, thereby exerting no adverse influence on the accuracy of the mirror surfaces.

The ceramic-type rotor 28 and the yoke 31 are strongly secured together by shrink-fitting. Even if a large centrifugal force is applied thereto, the amount of deformations of them are small and the accuracy of the mirror surfaces is not decreased.

Further, the aluminum-type rotor 33 is pressed and fixed between the flange section 32 and the ferrules 36 by set bolts 38. Since the elastic plate bodies 35 is included between the ferrules 36 and the aluminum-type rotor 33 and the aluminum-type rotor 33 is elastically fixed by a uniform fastening force over the entire circumference thereof, any deformation of the aluminum-type rotor 33 due to a centrifugal force will not be ununiform.

In the embodiment of FIGS. 1 to 5, the components of the motor, that is, the electromagnetic coil assembly including the magnet member 47 in the rotary assembly R and the electromagnetic coils 24 provided on the stationary section are positioned in such a way as to exert a force in the direction of the rotation axis. It is a so-called thrust-gap type motor. In a device in which such thrust-gap type motor is used, a downward thrust force acts on a rotary assembly via the yoke 31. Since the rotary assembly R can be pressed to the lower thrust plate 30 by preloading by means of a thrust force at this instance, the upper thrust plate 29 can be omitted.

Figure 6:
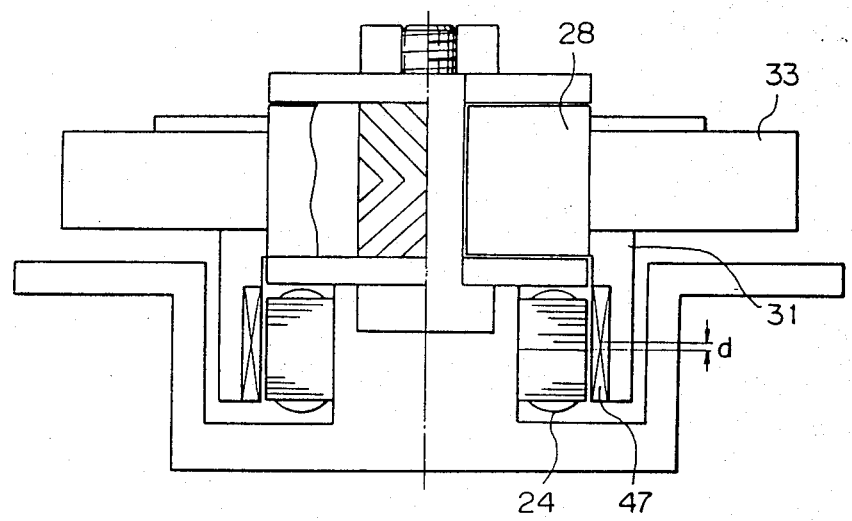
FIG. 6 is a partially sectional view illustrating the construction of different type of motor portion of the embodiment of the present invention.

FIG. 6 shows the embodiment of the present invention in which another type of a motor is used. The motor of FIG. 6 is a so-called radial-gap type motor, in which the magnet member 47 mounted on a rotary assembly and the electromagnetic coil 24 provided on the stationary section are positioned in the radial direction. The axial center of the magnet member 47 and the axial center of the electromagnetic coil 24 are deviated as much as distance d. A thrust force is generated by this arrangement, and a preload can be applied to the yoke 31. As mentioned above, one of the upper and lower thrust plates can be omitted.

Figure 7:
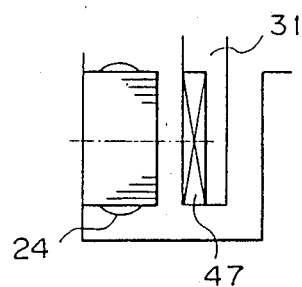
FIG. 7 is a partial view illustrating the construction of another type of motor portion.

In the radial gap type motor of FIG. 7, the axial center of the magnet member 47 and the axial center of the electromagnetic coil 24 are aligned. In this case, a thrust force is not produced and no preload is applied.

FIG. 8 shows the shaft sleeve 27 used in the present invention. The dynamic pressure generation grooves 27a having a herringbone configuration is provided around the outer circumference of the shaft sleeve 27 and a radial dynamic pressure bearing is formed.

FIG. 9 shows the thrust plate 29, 30 used in the present invention. Spiral grooves 29a, 30a for generating a dynamic pressure are disposed on the thrust plates 29, 30.

In the above-described embodiments, the grooves 27a, 29a and 30a for generating a dynamic pressure may be formed on the rotation side, namely, around the inner circumferential surface or end surface of the first rotor.

According to the rotation supporting device of a polygon mirror of the present invention, the second rotor, on which mirror surfaces are formed around its outer circumferential surface, has no unbalanced elements. When the mirror surface of the second rotor itself is accurately machined, the mirror surfaces will not be deformed ununiformly even during high-speed rotation. When the second rotor is made of plastic, aluminum or the like should be deposited. When it is made of aluminum, since the mirror surfaces of the second rotor itself can be machined, it is manufactured more easily than by deposition and machining accuracy is therefore improved.

When an intermediate ring is disposed between the first rotor and the second rotor, the differences between the amount of deformations due to high-speed rotation are alleviated and a large shrink-fitting allowance is not required.

According to the rotation supporting device of a polygon mirror in which the second rotor and the yoke are integrally fixed by means of at least set bolts, or both or either of the ferrules and elastic plate bodies in addition to the set bolts, the uniform fastening force of the second rotor forming mirror surfaces is maintained. As a result of this, the accuracy of the mirror surfaces is maintained and a correct image free from distortions can be obtained. In addition, the second rotor is not required to be shrink-fitted, so replacement is easy.

Individual parts of the rotary assembly are rotation balanced in practice of the present invention. When rotation balancing adjustment is made for assembly as a whole, for example, a weight can be added to or subtracted from the steel-type yoke. Therefore, no local unbalance will occur in the second rotor having mirror surfaces.

When the second rotor is aluminum-type, since the outer circumference of the aluminum-type rotor can be directly machined, the accuracy of the mirror surfaces themselves can be improved much more than in fabricating by deposition.

According to the present invention, the rotary assembly can be sufficiently rotated at high speed and what is more, its accuracy is excellent. Therefore, it is suitable for a rotation supporting structure of a polygon mirror. Operation efficiency of printers, readers and copiers can be improved. In addition, manufacturing costs are decreased.

According to the rotation supporting device of a polygon mirror of the present invention which includes a cylindrical yoke with a flange, deflections can be kept to a minimum during high-speed rotation. The difference between the amounts of deformations of the first rotor and the second rotor can be alleviated.

In the present invention, mounting and removal of the second rotor can be done very easily. What is more, when mirror surfaces are machined, advance integral fixing of the second rotor to a ceramic rotor is not required and a polygon mirror can accordingly be manufactured very easily.

According to the rotation supporting device of a polygon mirror having a bearing structure of the present invention, the right angles between the radial bearing and the thrust bearings can be achieved easily and the first rotor functions as a bearing for both the radial bearing and the thrust bearing, thus the number of parts is decreased and its structure is thereby simplified.

In the bearing structure of the present invention, by preloading in the direction of thrust, localized contact of a bearing can be prevented and starting torque can therefore be reduced. The presence of a force in opposition to the dynamic pressure at the time of rotation ensures a stable rotation. When used in a horizontal position, in particular, the rotation section of the motor will not spring out due to dynamic pressure in the thrust direction and the motor rotates stably.

What is claimed is:

1. A rotation supporting device of a polygon mirror, comprising:
    a stationary shaft provided with a shaft sleeve around its outer circumference;
    a rotary assembly rotatably mounted around the outer circumference of the shaft sleeve and having an outer circumferential surface in the radial direction of a polygon made to serve as mirror surfaces and a magnet member for generating a torque;
    an electromagnetic coil assembly disposed in the stationary section oppositely facing the magnet member; and
    at least one thrust plate suppressing the axial movement of the rotary assembly,
    said rotary assembly having a first rotor rotatably mounted around the outer circumference of the shaft sleeve, a second rotor having an outer circumferential surface of a polygon made to serve as mirror surfaces and secured around the outer circumference of the first rotor, and a yoke being disposed adjacent to one of the ends of the second rotor and secured around the outer circumference of the first rotor, said yoke being adhered with the magnet member.

2. A rotation supporting device as claimed in claim 1, wherein a balance ring is disposed adjacent to the other end of the second rotor on the opposite side of the yoke and said balance ring is shrink-fitted onto the first rotor.

3. A rotation supporting device as claimed in claim 1, wherein the first rotor is made of a ceramic material, the second rotor is aluminum-type and shrink-fitted around the outer circumference of the first rotor, and the yoke is made of steel and shrink-fitted around the outer circumference of the first rotor.

4. A rotation supporting device of a polygon mirror, comprising:
    a stationary shaft provided with a shaft sleeve around its outer circumference;
    a rotary assembly rotatably mounted around the outer circumference of the shaft sleeve and having an outer circumferential surface in the radial direction of a polygon made to serve as mirror surfaces and a magnet member for generating a torque;
    an electromagnetic coil assembly disposed in the stationary section oppositely facing the magnet member; and
    at least one thrust plate suppressing the axial movement of the rotary assembly,
    said rotary assembly having a first rotor rotatably mounted around the outer circumference of the shaft sleeve, an intermediate ring shrink-fitted around the outer circumference of the first rotor, a second rotor having an outer circumferential surface in the radial direction of a polygon made to serve as mirror surfaces and secured around the outer circumference of the intermediate ring and a yoke disposed adjacent to one of the ends of the second rotor and secured to the first rotor or around the outer circumference of the intermediate ring, wherein the yoke is adhered with a magnet member and the amount of elastic deformations of the intermediate ring is larger than that of the first rotor and smaller than that of the second rotor.

5. A rotation supporting device as claimed in claim 4, wherein the first rotor is made of a ceramic material, the intermediate ring is made of stainless steel materials, the second rotor is aluminum-type and shrink-fitted around the outer circumference of the intermediate ring, and the yoke being made of steel and shrink-fitted around the outer circumference of the first rotor or the intermediate ring.

6. A rotation supporting device of a polygon mirror, comprising:
- a stationary shaft provided with a shaft sleeve around its outer circumference;
- a rotary assembly rotatably mounted around the outer circumference of the shaft sleeve and having an outer circumferential surface in the radial direction of a polygon made to serve as mirror surfaces and a magnet member for generating a torque;
- an electromagnetic coil assembly disposed in the stationary section oppositely facing the magnet member; and
- at least one thrust plate suppressing the axial movement of the rotary assembly,
- said rotary assembly having a first rotor rotatably mounted around the outer circumference of the shaft sleeve, a second rotor having an outer circumferential surface of a polygon made to serve as mirror surfaces and disposed around the outer circumference of the first rotor, and a yoke being disposed adjacent to one of the ends of the second rotor and secured around the outer circumference of the first rotor, said yoke being adhere with the magnet member, and the second rotor and the yoke being integrally secured by securing means.

7. A rotation supporting device as claimed in claim 6, wherein the first rotor is made of a ceramic material, the second rotor is aluminum-type and the yoke is made of steel, and wherein the yoke is shrink-fitted around the outer circumference of the first rotor and securing means includes at least set bolts, or both or either the ferrules or elastic plate bodies in addition to set bolts.

8. A rotation supporting device of a polygon mirror, comprising:
- a stationary shaft provided with a shaft sleeve around its outer circumference;
- a rotary assembly rotatably mounted around the outer circumference of the shaft sleeve and having an outer circumferential surface in the radial direction of a polygon made to serve as mirror surfaces and a magnet member for generating a torque;
- an electromagnetic coil assembly disposed in the stationary section oppositely facing the magnet member; and
- at least one thrust plate suppressing the axial movement of the rotary assembly,
- said rotary assembly having a first rotor rotatably mounted around the outer circumference of the shaft sleeve, a cylindrical yoke with a flange secured around the outer circumference of the first rotor, and a second rotor having an outer circumferential surface of a polygon made to serve as mirror surfaces and disposed around the cylindrical portion of the yoke,
- said yoke being adhere with the magnet member, and the second rotor and the yoke being integrally secured by securing means.

9. A rotation supporting device as claimed in claim 8, wherein the first rotor is made of a ceramic material, the second rotor is aluminum-type and the yoke is made of steel, and wherein the yoke is shrink-fitted around the outer circumference of the first rotor and securing means includes at least set bolts, or both or either the ferrules or elastic plate bodies in addition to set bolts.

10. A rotation supporting device as claimed in any of claims 1 to 9, characterized in that a radial dynamic pressure bearing is formed between the outer circumference of the shaft sleeve and the rotary assembly, that a thrust plate is disposed facing opposite to both end surfaces of the rotary assembly, and that a dynamic thrust pressure bearing is formed between both end surfaces of the rotary assembly and each of the thrust plates.

11. A rotation supporting device as claimed in any of claims 1 to 9, characterized in that a radial dynamic pressure bearing is formed between the outer circumference of the shaft sleeve and the rotary assembly, that a thrust plate is disposed facing opposite to one of the end surfaces of the rotary assembly, and that a dynamic thrust pressure bearing is formed between one of the end surfaces and the mating thrust plate and a force is erected between the end surface and the thrust plate in the direction reverse to the thrust dynamic pressure.

12. A rotation supporting device as claimed in claim 11, characterized in that the force in the direction reverse to the thrust dynamic pressure is the force in the direction of the thrust in the magnetic force acting between the magnet member disposed on the rotary assembly and the electromagnetic coil assembly disposed on the stationary section.

* * * * *